G. H. PERKINS.
Soldering-Machine.

No. 214,441. Patented April 15, 1879.

UNITED STATES PATENT OFFICE.

GEORGE H. PERKINS, OF PHILADELPHIA, PENNSYLVANIA.

IMPROVEMENT IN SOLDERING-MACHINES.

Specification forming part of Letters Patent No. 214,441, dated April 15, 1879; application filed February 13, 1879.

*To all whom it may concern:*

Be it known that I, GEORGE H. PERKINS, of the city and county of Philadelphia, in the State of Pennsylvania, have invented a new and useful Improvement in Soldering-Machines, of which the following is a full, clear, and exact description, reference being had to the accompanying drawings, forming part hereof, in which—

Figure 1:
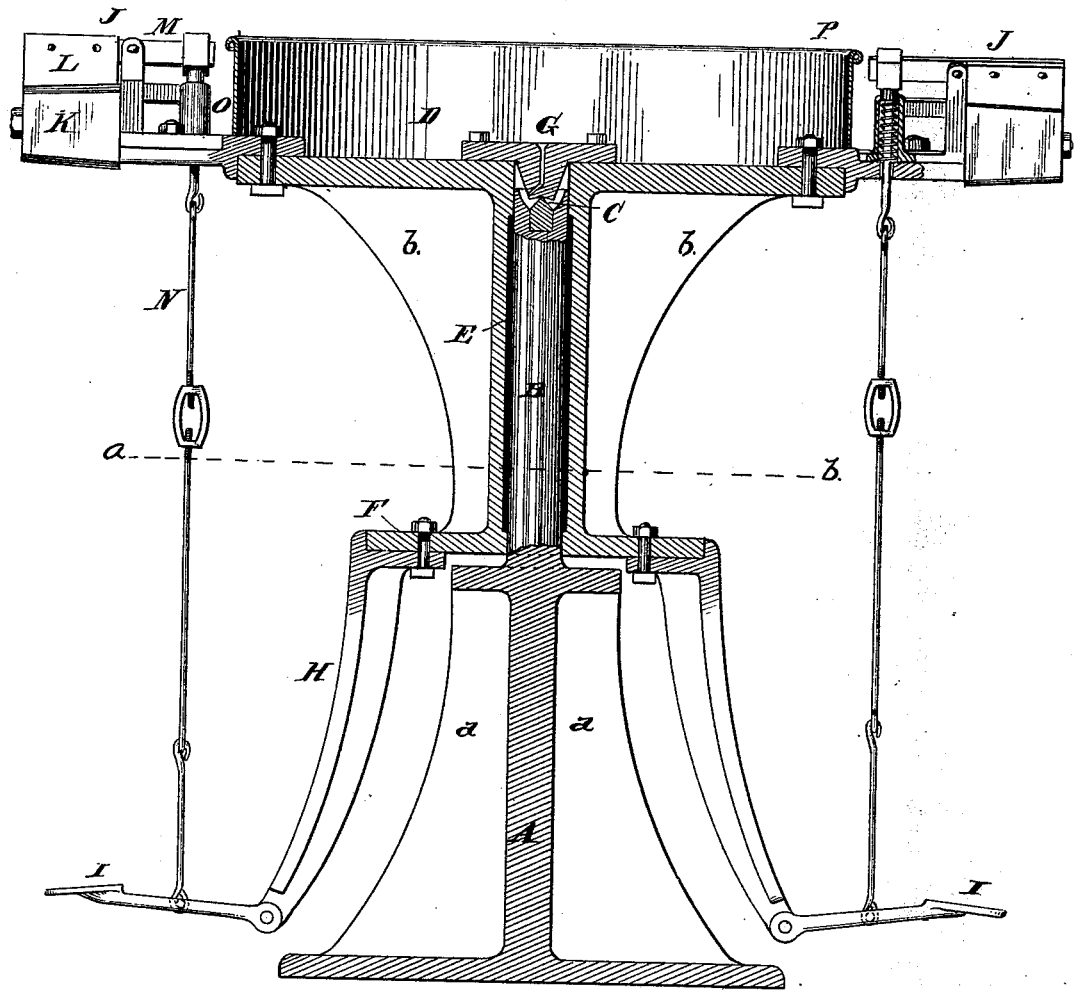
Figure 2:
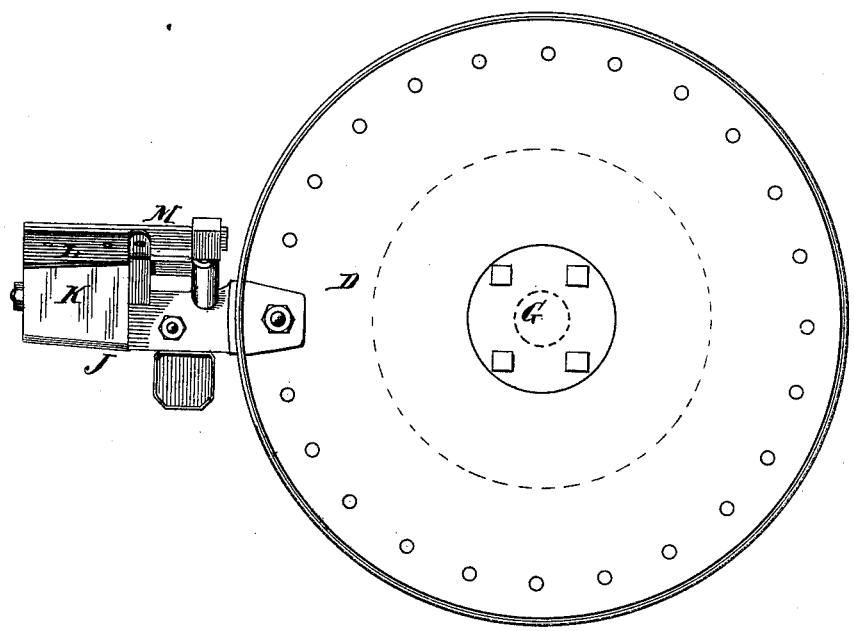
Figure 3:
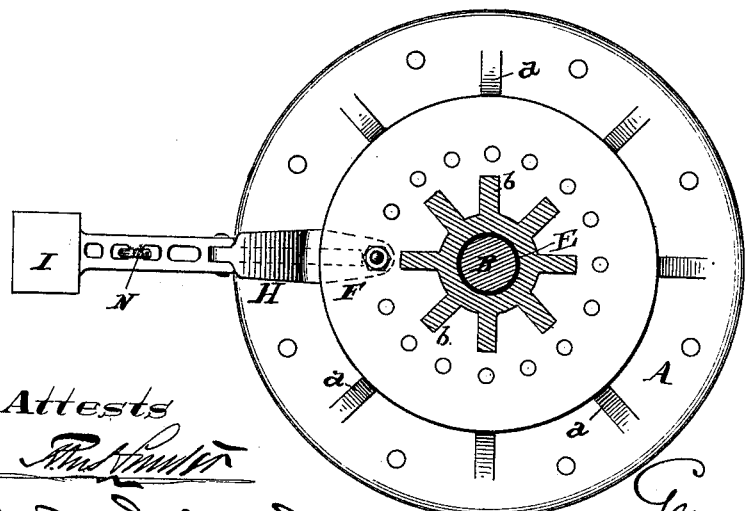

Figure 1 is an entire central sectional elevation, the soldering mechanism, however, not being sectioned; Fig. 2, a top-plan view of the soldering-table; and Fig. 3, a top-plan view of the base of the same, showing the top of the treadle-bracket, the section being supposed upon the line $a\ b$ of Fig. 1.

Similar letters of reference indicate corresponding parts wherever used.

My invention relates to that class of rotary clamping and soldering machines which are set forth in English Letters Patent to Clark, No. 1,230, A. D. 1870; and consists in an improvement upon the same, whereby the application of treadles to operate the clamp in place of hand-levers is rendered possible.

Referring to the drawings, the following is a description of my invention.

A is the base, an upright casting of any desired form, central from and erect, upon which is a stem, B, provided with a pivot-point, C, at its upper extremity. $a\ a$ are webs in the base-casting. D is the soldering-table, a circular table of any convenient diameter, provided with a depending hollow sleeve, E, braced by means of webs $b\ b$, or the like, the interior diameter of which sleeve is correspondent with the diameter of the stem B, and which terminates at its lower extremity in a spreading circular treadle-bracket, F. G is a pivot-bearing, secured to the table-top in such a manner as to come over and rest upon the pivot-point C, the result of which is, the sleeve closely encircling the stem, that the soldering-table and its depending bracket rotate freely upon the base, about the stem thereof. H designates treadle-legs, any given number of which are secured to the treadle-bracket, depending therefrom at any convenient angle, but so placed as to clear the webs or any portion of the base. They are provided at their bottom extremities with treadles I.

J is any form of clamping and soldering apparatus, that represented being the block and clamp in common use, K representing the block, and L the clamp, the arm M of the latter of which is connected with the treadle-bar N, which passes down to the treadle below it.

A coiled spring, inclosed within the cylinder O, through which the upper section of the treadle-bar passes, acts ordinarily to keep the clamp down upon the block in position to hold the side seam of the can.

Any desired number of soldering blocks and clamps are applied to the table, and a corresponding number of treadle-legs and treadles to the treadle-bracket. Two sets only are represented in Fig. 1 of the drawings, in the interest of clearer illustration; but in Figs. 2 and 3 it is shown that many more could be applied.

P is a circular wall erected around the soldering-table, so as to make its top a receptacle for any desired soldering utensil, cans, or the like.

The treadles, corresponding in number to the clamps, come around into position simultaneously with the blocks and clamps, so that each treadle presents itself to those operating without their being obliged to move their position.

Having thus described my invention, I claim and desire to secure by Letters Patent of the United States—

In combination with a rotating soldering-table provided with any given number of radially-arranged clamping devices, J, a series of treadles, I, corresponding in number with and arranged to operate said clamping devices, and rotating with said table.

In testimony whereof I have hereunto signed my name this 10th day of January, A. D. 1879.

GEORGE H. PERKINS.

In presence of—
J. BONSALL TAYLOR,
JOHN JOLLEY, Jr.